(12) United States Patent
Osonoi et al.

(10) Patent No.: US 9,340,226 B2
(45) Date of Patent: May 17, 2016

(54) STEERING APPARATUS

(71) Applicant: NISSAN MOTOR CO., LTD., Kanagawa (JP)

(72) Inventors: Tetsuya Osonoi, Tokorozawa (JP); Takuya Narasaki, Atsugi (JP); Noriki Kubokawa, Atsugi (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 38 days.

(21) Appl. No.: 14/366,380

(22) PCT Filed: Oct. 31, 2012

(86) PCT No.: PCT/JP2012/006994
§ 371 (c)(1),
(2) Date: Jun. 18, 2014

(87) PCT Pub. No.: WO2013/094105
PCT Pub. Date: Jun. 27, 2013

(65) Prior Publication Data
US 2014/0360310 A1 Dec. 11, 2014

(30) Foreign Application Priority Data

Dec. 21, 2011 (JP) .................................. 2011-280503
Dec. 21, 2011 (JP) .................................. 2011-280504

(51) Int. Cl.
*B62D 1/187* (2006.01)
*B62D 1/16* (2006.01)
(Continued)

(52) U.S. Cl.
CPC ...... *B62D 1/187* (2013.01); *B62D 1/16* (2013.01); *B62D 1/195* (2013.01); *B62D 5/001* (2013.01); *B62D 5/003* (2013.01)

(58) Field of Classification Search
CPC .......... B62D 1/187; B62D 1/195; B62D 1/16; B62D 5/001
USPC ............................................. 280/777; 74/493
See application file for complete search history.

(56) References Cited

U.S. PATENT DOCUMENTS 5,024,118 A * 6/1991 Khalifa .................. B62D 1/195
188/376
5,503,431 A * 4/1996 Yamamoto ............. B62D 1/184
188/376
(Continued)

FOREIGN PATENT DOCUMENTS

JP           54-2931       1/1979
JP         09-002290 A     1/1997
(Continued)

*Primary Examiner* — James English
(74) *Attorney, Agent, or Firm* — Young Basile Hanlon & MacFarlane P.C.

(57) ABSTRACT

A steering wheel is coupled to a steering gear via a steering shaft, an intermediate shaft, a clutch input shaft and a clutch output shaft. When viewed in a vehicle transverse direction, a tilt angle α of the clutch input shaft relative to the horizontal plane is set to be smaller than a tilt angle β of the intermediate shaft relative to the horizontal plane. A steering column is supported by a vehicle body via a tilt pivot for adjusting a tilt position. Even when the steering column is located at any tilt position, the relationship of α<β is set to be maintained when viewed in the vehicle transverse direction. The center position of a universal joint between the steering shaft and the intermediate shaft is misaligned with the center position of the tilt pivot when viewed in the vehicle transverse direction.

5 Claims, 9 Drawing Sheets

(51) Int. Cl.
 *B62D 1/19* (2006.01)
 *B62D 5/00* (2006.01)

(56) References Cited

U.S. PATENT DOCUMENTS

| | | | | |
|---|---|---|---|---|
| 5,626,364 A | * | 5/1997 | Nakamura | B62D 1/16 280/777 |
| 5,876,065 A | * | 3/1999 | Ogura | B62D 1/197 280/777 |
| 6,032,981 A | * | 3/2000 | Imanishi | B62D 1/192 280/777 |
| 6,216,552 B1 | * | 4/2001 | Friedewald | B62D 1/195 188/371 |
| 2005/0151361 A1 | * | 7/2005 | Hori | B62D 1/197 280/775 |
| 2011/0100148 A1 | * | 5/2011 | Jung | B62D 1/195 74/492 |
| 2015/0225009 A1 | * | 8/2015 | Sakata | B62D 1/184 74/493 |

FOREIGN PATENT DOCUMENTS

| | | |
|---|---|---|
| JP | 2000-016304 A | 1/2000 |
| JP | 2007-269280 A | 10/2007 |
| JP | 2009-029152 A | 2/2009 |

* cited by examiner

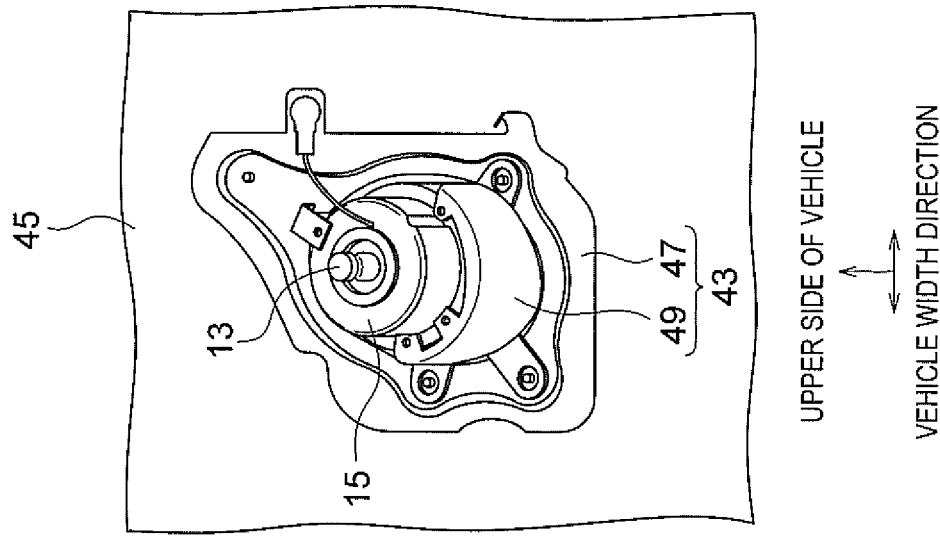
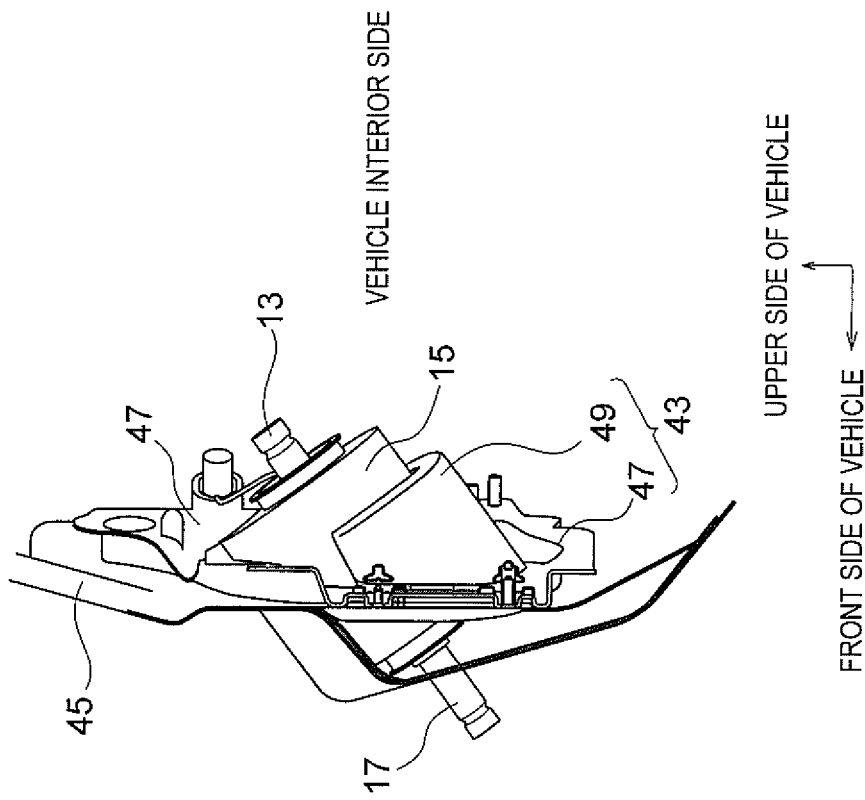

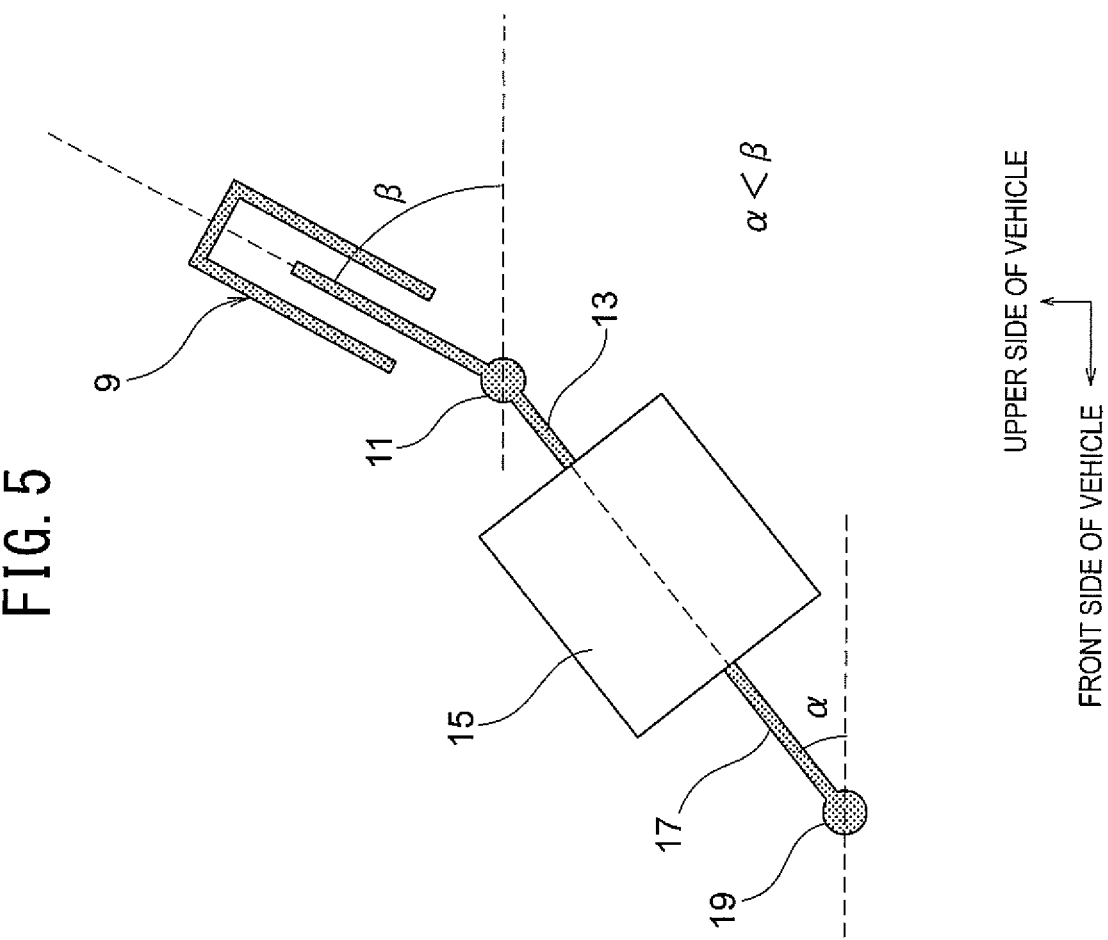

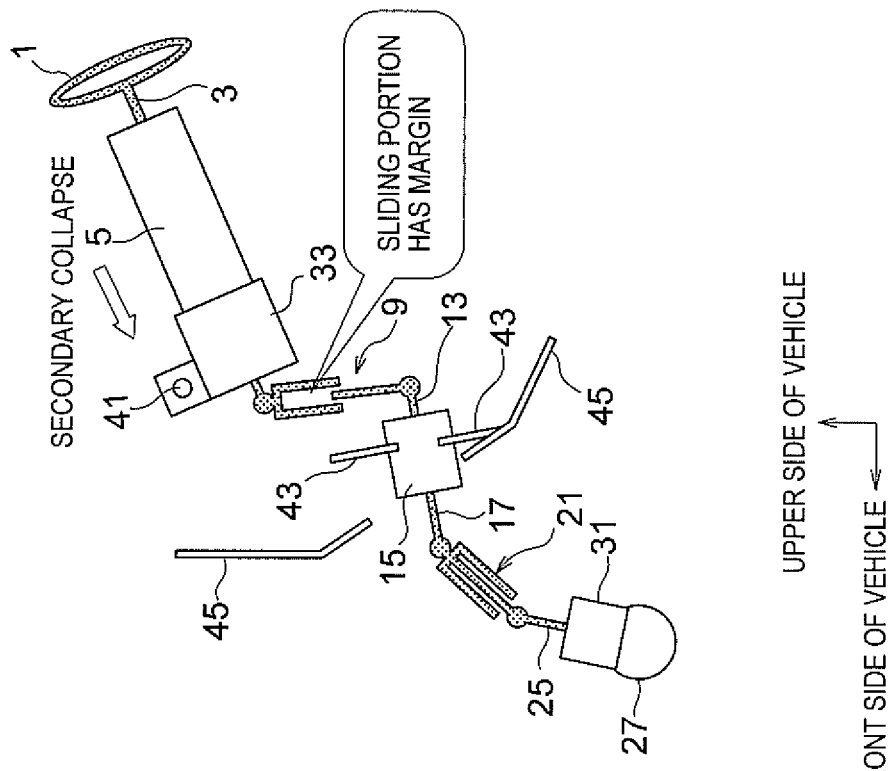
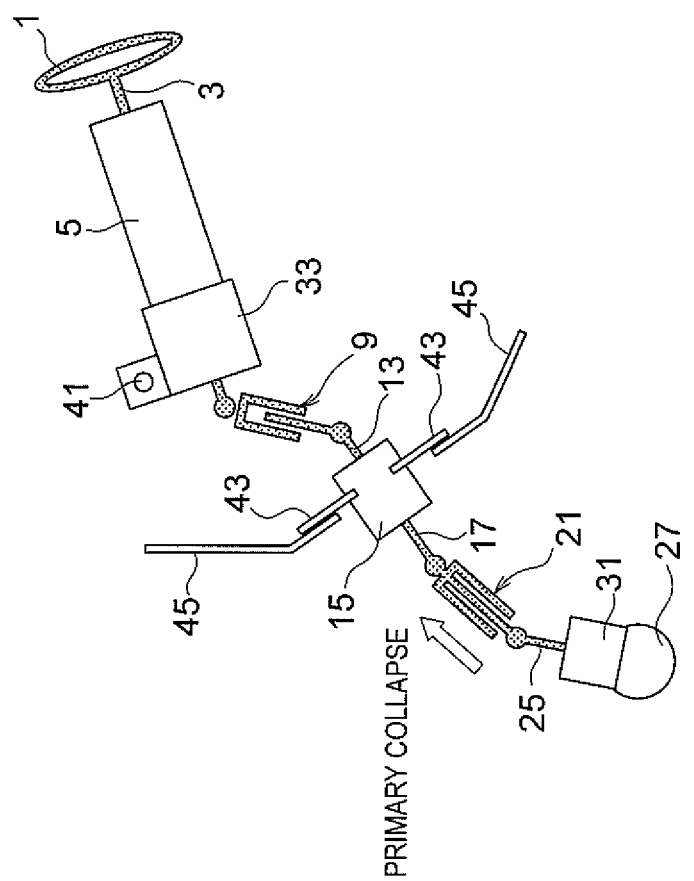

FIG. 7
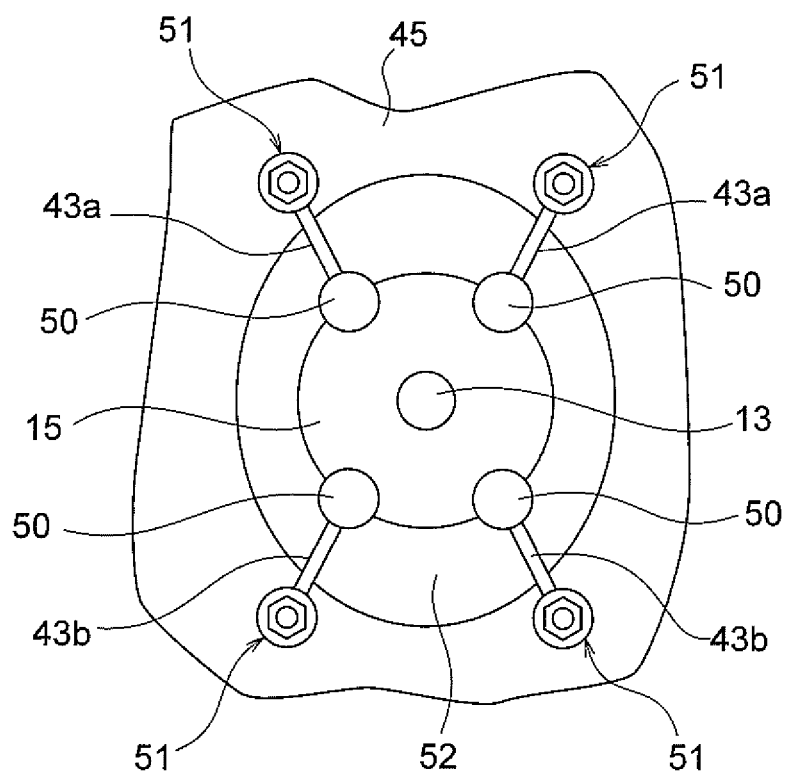
UPPER SIDE OF VEHICLE
VEHICLE WIDTH DIRECTION

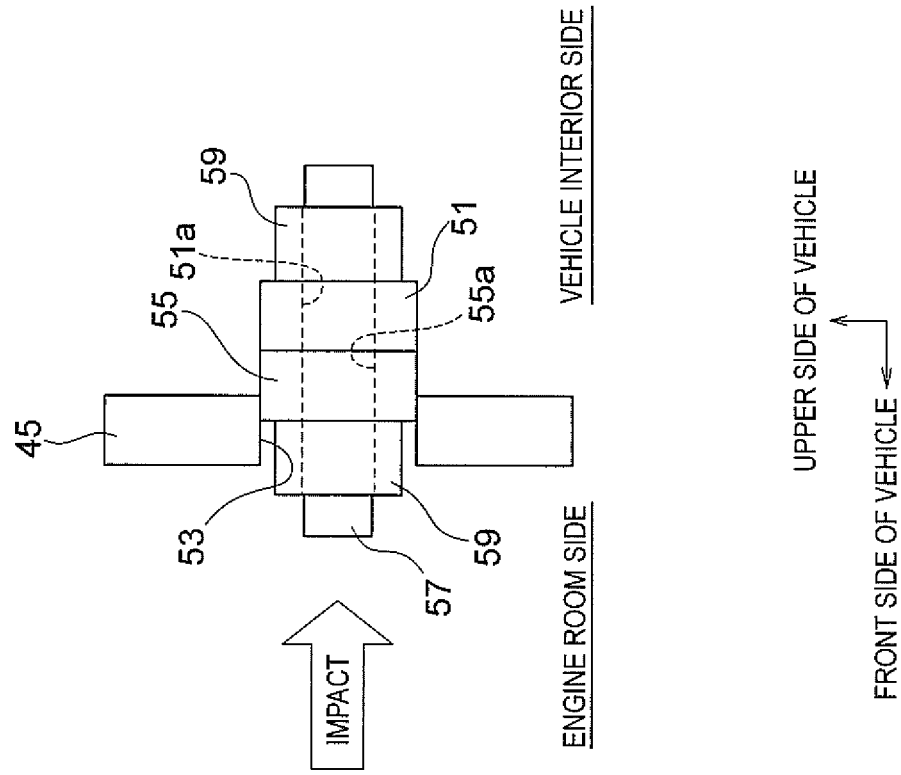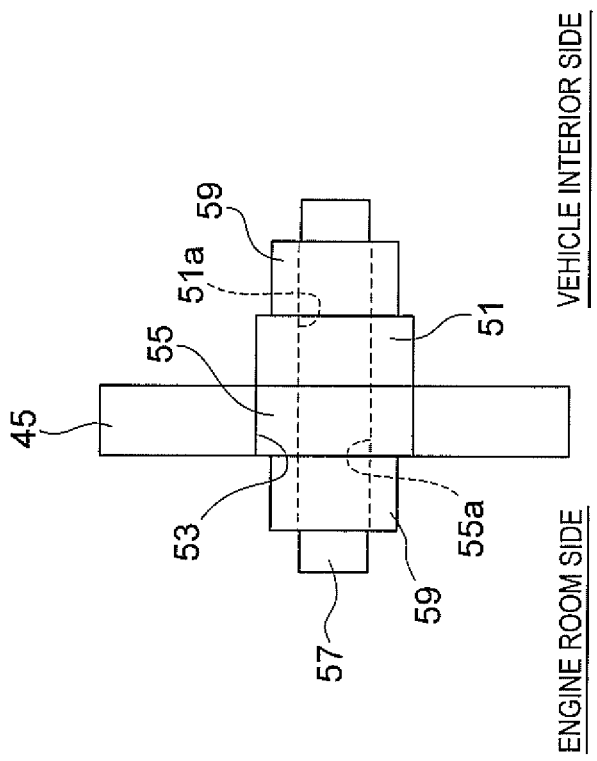

STEERING APPARATUS

CROSS REFERENCE TO RELATED APPLICATION

The present application claims priority to Japanese Patent Application Nos. 2011-280503, filed Dec. 21, 2011; and 2011-280504, filed Dec. 21, 2011, each incorporated herein in its entirety.

TECHNICAL FIELD

The present invention relates to a steering apparatus.

BACKGROUND

In the conventional technique described in JP 2000-016304 A, a joint position of an upper shaft and a lower shaft in a steering mechanism is aligned with a tilt pivot center of a steering column supporting the upper shaft.

In some cases, the number of joint points using a universal joint has to be increased depending on a system configuration or layout. In this case, it is difficult to satisfactorily guarantee the distance between joints. Therefore, when an impact load in a vehicle longitudinal direction is input to a steering mechanism, it is difficult to obtain satisfactory impact absorption ability.

BRIEF SUMMARY

An object of the present invention is to improve impact absorption ability of a steering apparatus.

In a steering apparatus according to an aspect of the present invention, a steering wheel is coupled to a steering gear via a steering shaft, an intermediate shaft, a clutch input shaft, and a clutch output shaft. When viewed in a vehicle transverse direction, a tilt angle of the intermediate shaft relative to a horizontal plane is set to be larger than a tilt angle of the clutch input shaft relative to the horizontal plane.

BRIEF DESCRIPTION OF THE DRAWINGS

FIGS. 4A and 4B are diagrams illustrating an assembled state of a clutch;

FIG. 5 is a diagram illustrating a mounting angle of the clutch;

FIGS. 6A and 6B are diagrams illustrating a primary collapse and a secondary collapse when an impact load in a vehicle longitudinal direction is input;

FIG. 7 is a diagram illustrating an assembled state of the clutch 15 when viewed from a vehicle interior side;

FIGS. 8A and 8B are cross-sectional views of a dash panel-side coupling end.

DESCRIPTION OF THE EMBODIMENTS

Hereinafter, embodiments of the present invention will be described with reference to the accompanying drawings.

Figure 1:
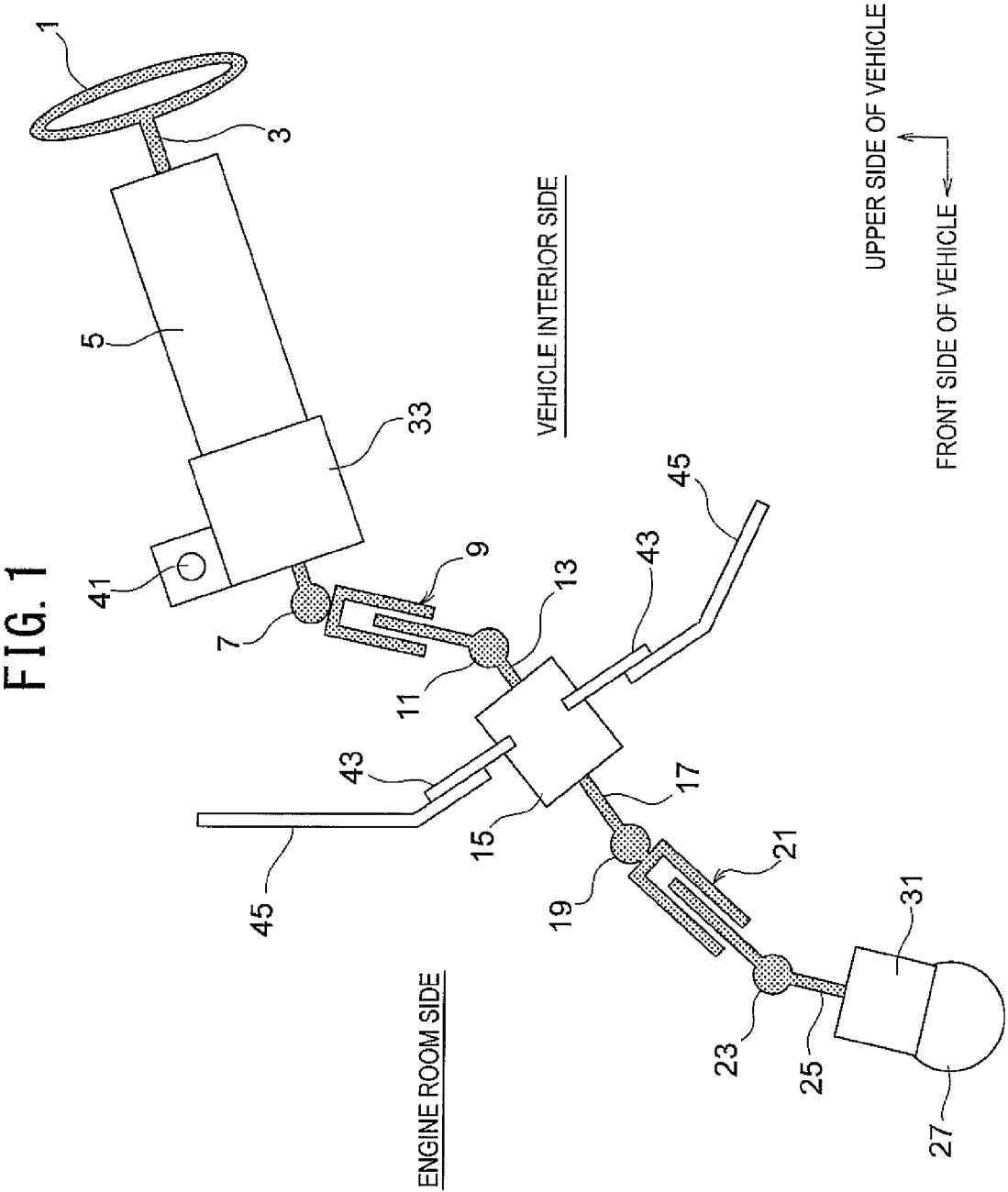
FIG. 1 is a diagram illustrating a steer-by-wire type steering structure.

FIG. 1 is a diagram illustrating a steer-by-wire type steering structure. A steering wheel 1 is coupled to one end of a steering shaft 3, and the steering shaft 3 is rotatably supported by a steering column 5. The other end of the steering shaft 3 is coupled to one end of an intermediate shaft 9 via a universal joint 7. The steering column 5 is provided with a reaction force motor 33 coupled to the steering shaft 3. The reaction force motor 33 applies a reaction torque to the steering shaft 3, the reaction torque being depending on a road reaction force transmitted to the steering wheel from turning wheels to be steered depending on a turning angle. Accordingly, even when a clutch 15 is released, a driver can understand the road reaction force depending on the steering state. The other end of the intermediate shaft 9 is coupled to one end of a clutch input shaft 13 via a universal joint 11. The other end of the clutch input shaft 13 coaxially faces one end of a clutch output shaft 17 and the clutch 15 is interposed between the clutch input shaft 13 and the clutch output shaft 17. The clutch 15 connects and disconnects the clutch input shaft 13 and the clutch output shaft 17.

The other end of the clutch output shaft 17 is coupled to one end of an intermediate shaft 21 via a universal joint 19. The other end of the intermediate shaft 21 is coupled to one end of a pinion shaft 25 via a universal joint 23, and the other end of the pinion shaft 25 is coupled to a steering gear 27 which is of a rack and pinion type. Although not illustrated, both ends of a rack as an output side of the steering gear 27 are coupled to ends of right and left tie rods, and the other ends of the tie rods are coupled to vehicle wheels.

Accordingly, when the steering wheel 1 is made to rotate in a state where the clutch 15 is connected, the pinion shaft 25 rotates via the steering shaft 3, the intermediate shaft 9, the clutch input shaft 13, the clutch output shaft 17, and the intermediate shaft 21. The rotational movement of the pinion shaft 25 is converted into forward and backward movement of the rack by the steering gear 27, and the tie rods are pushed or pulled with the forward and backward movement of the rack, whereby the vehicle wheels are steered.

A steering motor 31 (steering mechanism) is coupled to the pinion shaft 25, and when the steering motor 31 is drive in a state where the clutch 15 is disconnected, the pinion shaft 25 rotates and thus the vehicle wheels are steered. Therefore, by detecting the steering angle of the steering wheel 1 and controlling the driving of the steering motor 31 on the basis of the detected steering angle, the steered angle of the vehicle wheels is controlled.

The reaction force motor 33 is coupled to the steering shaft 3. When the reaction force motor 33 is driven in a state where the clutch 15 is disconnected, a reaction torque is applied to the steering shaft 3. Accordingly, by detecting or estimating a reaction force received from the road surface when the vehicle wheels are steered and controlling the driving of the reaction force motor 33 on the basis of the detected and estimated reaction force, an operation reaction force is applied to a driver's steering operation.

In general, by controlling the driving of the steering motor 31 and controlling the driving of the reaction force motor 33 in a state where the clutch 15 is disconnected, a steer-by-wire operation is performed to realize desired steering characteristics or turning behavior characteristics and to realize a good feeling of operation. On the other hand, when abnormality occurs in a system, mechanical backup is guaranteed by stopping the steer-by-wire operation and returning the clutch 15 to the connected state by a failsafe.

The steering column 5 is supported by a vehicle body via a tilt pivot 41 so as to swing. The steering structure has a layout in which the center position of the universal joint 7 between the steering shaft 3 and the intermediate shaft 9 is misaligned with the center position of the tilt pivot 41 when viewed in a vehicle transverse direction.

The intermediate shaft 9 and the intermediate shaft 21 are configured to extend and contract in the axis direction. The clutch 15 is fixed to a dash panel 45 via a bracket 43.

Figure 2:
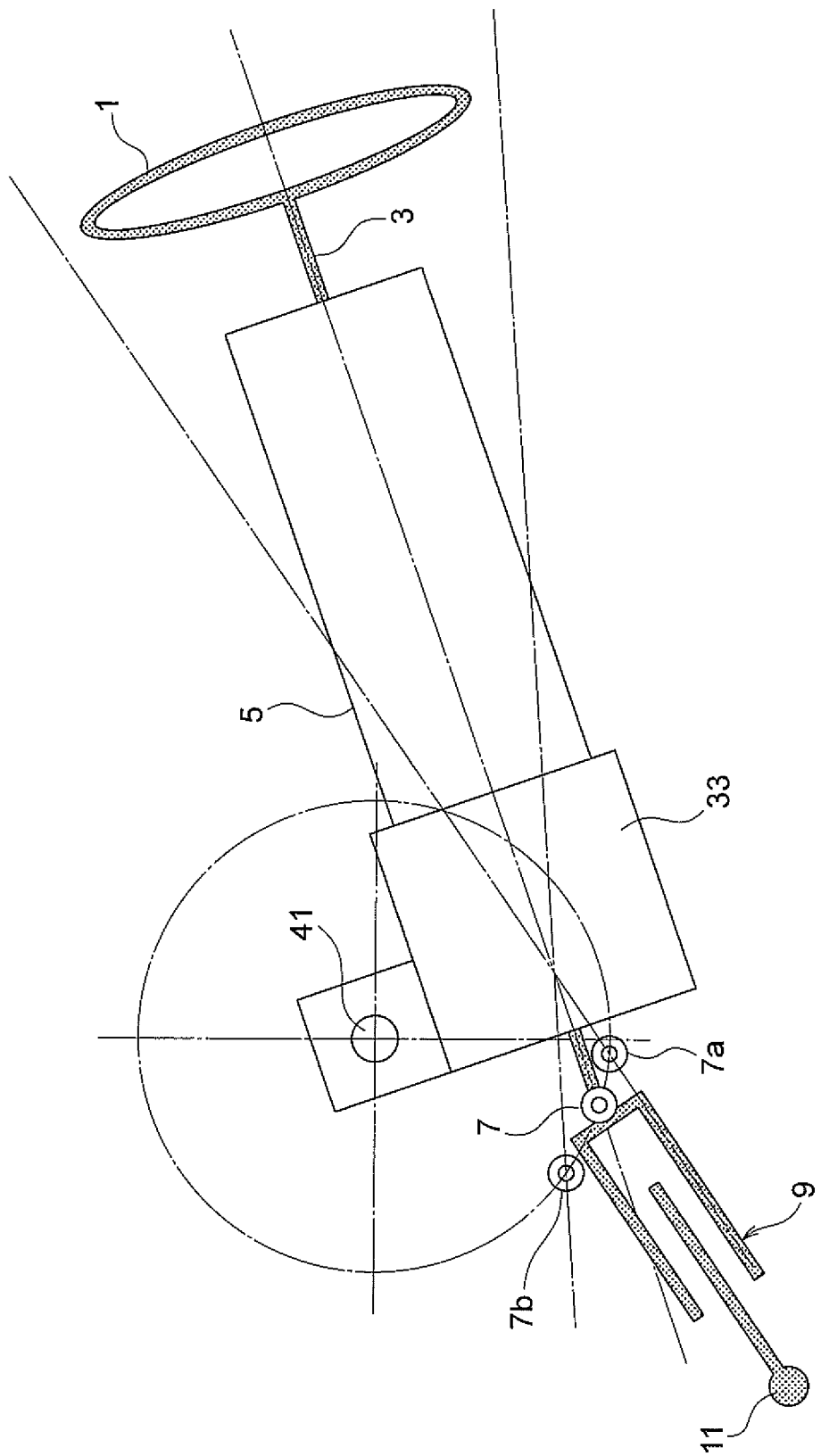
FIG. 2 is a diagram illustrating a tilting operation of a steering column.

FIG. 2 is a diagram illustrating a tilting operation of the steering column. The steering column 5 is of a so-called shake waist type in which the other end side is supported by the vehicle body via the tilt pivot 41, and the tilt position (swing position) can be adjusted by causing one end side of the steering column 5 to swing about the tilt pivot 41 in a vehicle vertical direction. Accordingly, the universal joint 7 coupling the steering shaft 3 to the intermediate shaft 9 is displaced in the circumferential direction centered on the tilt pivot 41 whenever the tilt position of the steering column 5 is changed with the tilting operation. That is, the universal joint 7 is displaced in a range of from a point 7*a* at which the steering wheel 1 is raised to the highest position to a point 7*b* at which the steering wheel 1 is lowered to the lowest position.

At this time, the variation in the relative distance between the universal joint 7 and the universal joint 11 located at both ends of the intermediate shaft 9 is permitted by extension and contraction of the intermediate shaft 9. That is, when the steering wheel 1 is raised to the highest position and the universal joint 7 is displaced to the point 7*a*, the relative distance between the universal joints 7 and 11 varies to increase and the variation is permitted by the extension of the intermediate shaft 9. When the steering wheel 1 is lowered to the lowest position and the universal joint 7 is displaced to the point 7*b*, the relative distance between the universal joints 7 and 11 varies to decrease and the variation is permitted by the contraction of the intermediate shaft 9.

When the tilt position of the steering column 5 varies with the tilting operation, the angle of the intermediate shaft 9 relative to the horizontal plane also varies. That is, when the steering wheel 1 is raised to the highest position and the universal joint 7 is displaced to the point 7*a*, the angle of the intermediate shaft 9 relative to the horizontal plane decreases. When the steering wheel 1 is lowered to the lowest position and the universal joint 7 is displaced to the point 7*b*, the angle of the intermediate shaft 9 relative to the horizontal plane increases.

Figure 3:
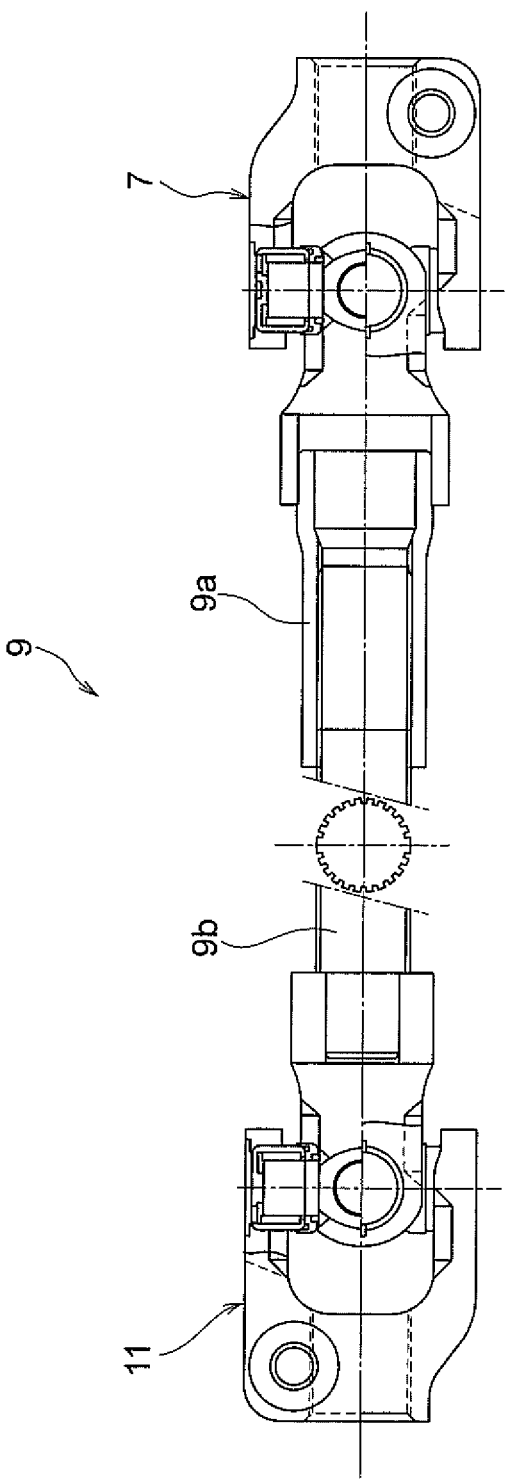
FIG. 3 is a diagram illustrating a configuration of an intermediate shaft.

FIG. 3 is a diagram illustrating a configuration of an intermediate shaft. The intermediate shaft 9 includes an input shaft 9*a* and an output shaft 9*b* fitted into the input shaft 9*a*, and the relative rotation therebetween is prevented and the relative displacement therebetween in the axis direction is permitted by fitting the input shaft and the output shaft in a spline engagement manner or a serration engagement manner. The intermediate shaft 21 has the same structure as the intermediate shaft 9.

FIGS. 4A and 4B are diagrams illustrating an assembled state of the clutch. FIG. 4A is a diagram illustrating the assembled state of the clutch 15 when viewed from a vehicle left side. FIG. 4B is a diagram illustrating the assembled state of the clutch 15 when viewed from the vehicle interior side. The bracket 43 is fixed to the dash panel 45 and includes a bracket body 47 fixed to the dash panel 45 and a support bracket 49 fixed to the bracket body 47.

The bracket body 47 is formed in an annular shape in which the center of a plate member is hollowed to have an inner circumference corresponding to the outer shape of the clutch 15, and the clutch 15 is disposed inside the annular shape. The bracket body 47 is fixed to the dash panel 45 from the vehicle interior side and is coupled to the top surface of the clutch 15.

The support bracket 49 is formed in a semi-cylindrical shape corresponding to the outer shape of the clutch 15 and the clutch 15 is disposed inside the semi-cylindrical shape. One end of the support bracket 49 is fixed to the bracket body 47 from the vehicle interior side and the other end thereof is coupled to the bottom surface of the clutch 15.

FIG. 5 is a diagram illustrating a mounting angle of the clutch. As viewed in the vehicle transverse direction, the tilt angle of the clutch input shaft 13 relative to the horizontal plane is defined as $\alpha$ and the tilt angle of the intermediate shaft 9 relative to the horizontal plane is defined as $\beta$, the mounting angle of the clutch 15 is set so that the tilt angle $\beta$ is larger than the tilt angle $\alpha$. When the universal joint 7 is displaced with the tilting operation, the length in the axis direction of the intermediate shaft 9 varies and the tilt angle $\beta$ relative to the horizontal plane also varies. Accordingly, even at any tilt angle $\beta$ varying with the tilting operation, the mounting angle of the clutch 15 is set so as to maintain the relationship $\beta > \alpha$.

In the steer-by-wire type, in order to guarantee mechanical backup, the clutch 15 is disposed in the path from the steering shaft 3 to the steering gear 27. In this system configuration, the number of joint points of the universal joint has to be increased. Accordingly, it is difficult to satisfactorily guarantee the distance between the universal joints, and it is difficult to obtain satisfactory impact absorbing ability when the impact load in the vehicle longitudinal direction is input to the steering mechanism.

Therefore, in this embodiment, when viewed in the vehicle transverse direction, the tilt angle $\alpha$ of the clutch input shaft 13 relative to the horizontal plane is set to be smaller than the tilt angle $\beta$ of the intermediate shaft 9 relative to the horizontal plane. Accordingly, since the length of the intermediate shaft 9 can be increased, it is possible to extend an impact absorption amount of the intermediate shaft 9 correspondingly. As a result, it is possible to improve impact absorption ability when an impact load in the vehicle longitudinal direction is input.

When the tilt position of the steering column 5 varies by the tilting operation, the angle $\beta$ of the intermediate shaft 9 relative to the horizontal plane varies. That is, when the steering wheel 1 is raised to the highest position and the universal joint 7 is displaced to the point 7*a*, the angle $\beta$ of the intermediate shaft 9 relative to the horizontal plane decreases. When the steering wheel 1 is lowered to the lowest position and the universal joint 7 is displaced to the point 7*b*, the angle $\beta$ of the intermediate shaft 9 relative to the horizontal plane increases.

That is, the angle $\beta$ of the intermediate shaft 9 is the maximum when the steering wheel 1 is lowered to the lowest position. The angle $\beta$ of the intermediate shaft 9 is the minimum when the steering wheel 1 is raised to the highest position, and in state of this tilt position, the tilt angle $\alpha$ of the clutch input shaft 13 is set to be smaller than the tilt angle $\beta$ of the intermediate shaft 9. Accordingly, in this way, even when the steering column 5 is located at any tilt position, the relationship of $\beta > \alpha$ can be maintained and thus the same advantages as described above can be obtained.

On the other hand, the tilt angle of the pinion shaft 25 relative to the horizontal plane is also set to be larger than the tilt angle of the intermediate shaft 21 relative to the horizontal plane when viewed in the vehicle transverse direction. Accordingly, since the length of the intermediate shaft 21 can be extended, it is possible to extend the impact absorption amount of the intermediate shaft 21 correspondingly. As a result, it is possible to improve impact absorption ability when an impact load in the vehicle longitudinal direction is input.

FIGS. 6A and 6B are diagrams illustrating a primary collapse and a secondary collapse when such an impact load in the vehicle longitudinal direction that make the clutch back to the vehicle interior side is input. FIG. 6A illustrates a state where an impact load toward the vehicle rear side is input to a vehicle front part and a primary collapse occurs in the intermediate shaft 21, and FIG. 6B illustrates a state where an impact load toward the vehicle rear side is input to the vehicle front part and the bracket 43 is disengaged from the dash panel 45.

First, when an impact load toward the vehicle rear side is input to the vehicle front part, the steering gear 25 or the pinion shaft 25 is displaced to the vehicle rear side and thus the intermediate shaft 21 contracts. By guaranteeing the impact absorption amount of the intermediate shaft 21, it is possible to improve impact absorption ability when an impact load in the vehicle longitudinal direction is input.

When the impact load exceeds the impact absorption ability of the intermediate shaft 21, the exceeded impact load is input to the bracket 43. At this time, when the impact load is greater than a predetermined threshold value, the bracket 43 is disengaged from the dash panel 45.

When the bracket is disengaged from the dash panel, the point of the universal joint 11 between the clutch input shaft 13 and the intermediate shaft 9 moves to the right side in the drawing, that is, to the vehicle rear side. On the other hand, when an impact load toward the vehicle front side is input to the steering wheel 1 as a secondary collapse by a driver, the point of the universal joint 7 moves to the left side in the drawing, or to the vehicle front side. That is, when the primary collapse by which clutch 15 moves to the vehicle rear side is input and the attachment position of the clutch 15 moves, it is possible to prevent the movement of the clutch from hindering the movement of the steering shaft toward the vehicle front side due to the secondary collapse to guarantee the impact absorption amount.

The position of the tilt pivot 41 will be described below. When viewed in the vehicle transverse direction, the center position of the universal joint 7 between the steering shaft 3 and the intermediate shaft 9 and the center position of the tilt pivot 41 are misaligned with each other. In this way, since the center position of the tilt pivot 41 is misaligned with the center position of the universal joint 7, it is possible to mainly suppress an increase in size of the tilt pivot 41 in the vehicle width direction. That is, when the center position of the universal joint 7 and the center position of the tilt pivot 41 are aligned with each other, holding portions of the tilt pivot 41 has to be formed such that the universal joint 7 is interposed between the holding portions, and thus mainly, the size of the tilt pivot 41 in the vehicle width direction increases. Accordingly, by misaligning the center position of the universal joint 7 with the center position of the tilt pivot 41, it is possible to avoid the above-mentioned problem.

In this embodiment, the steering motor 31 is coupled to the pinion shaft 25 in the steer-by-wire system, but the present invention is not limited to this structure. For example, the steering motor 31 may be coupled to the rack. That is, any structure may be employed as long as a drive force can be applied to a power transmission system on the clutch output shaft 17 side in a state where the clutch 15 is disconnected so as to steer the vehicle wheels.

In addition, the numbers, shapes, sizes, and the like of the constituent elements can be arbitrarily set without departing from the gist of this embodiment.

Effects of the main portions in the first embodiment will be described below.

(1) The steering wheel 1 is coupled to the steering gear 27 via the steering shaft 3, the intermediate shaft 9, the clutch input shaft 13, and the clutch output shaft 17. When viewed in the vehicle transverse direction, the tilt angle $\alpha$ of the clutch input shaft 13 relative to the horizontal plane is set to be smaller than the tilt angle $\beta$ of the intermediate shaft 9 relative to the horizontal plane. In this way, by setting the tilt angle $\alpha$ of the clutch input shaft 13 and the clutch output shaft 17 to be smaller than the tilt angle $\beta$ of the intermediate shaft 9, it is possible to extend the length of the intermediate shaft 9 and thus to extend the impact absorption amount of the intermediate shaft 9 correspondingly. Accordingly, it is possible to improve impact absorption ability when an impact load in the vehicle longitudinal direction is input.

(2) The steering column 5 is supported by the vehicle body via the tilt pivot 41 for adjusting the tilt position, and when the tilt position of the steering column 5 is within a predetermined movable range, the relationship of $\beta > \alpha$ is set to be maintained as viewed in the vehicle transverse direction. Accordingly, even when the steering column 5 is located at any tilt position, the same effects as described above can be obtained.

(3) The center position of the universal joint 7 between the steering shaft 3 and the intermediate shaft 9 and the center position of the tilt pivot 41 are misaligned with each other when viewed in the vehicle transverse direction. In this way, since the center position of the tilt pivot 41 is misaligned with the center position of the universal joint 7, it is possible to suppress an increase in size of the tilt pivot 41 in the vehicle width direction.

In a second embodiment, there is provided another aspect of the clutch attachment structure. The clutch 15 is fixed to the dash panel 45 via an upper bracket 43*a* and a lower bracket 43*b*. FIG. 7 is a diagram illustrating an assembled state of the clutch. This drawing illustrates the assembled state of the clutch 15 when viewed from the vehicle interior side.

An opening 52 penetrating from an engine room side to the vehicle interior side is formed in the dash panel 45, and the clutch 15 is disposed in the opening 52. Each of the upper bracket 43*a* and the lower bracket 43*b* is formed in a rod shape. The upper part of the clutch 15 in the opening 52 is supported by two upper brackets 43*a* from the vehicle interior side, and the lower part of the clutch 15 in the opening 52 is supported by two lower brackets 43*b* from the vehicle interior side.

The upper bracket 43*a* and the lower bracket 43*b* couple clutch-side coupling ends 50 to the clutch 15, and couple dash panel-side coupling ends 51 as the other ends to the dash panel 45. Each clutch-side coupling end 50 is coupled to the clutch 15. On the other hand, each dash panel-side coupling end 51 has a structure in which it is disengaged (separated) when a predetermined impact load toward the vehicle rear side is input to the vehicle front part and the dash panel-side coupling end 51 of the upper bracket 43*a* is set to be disengaged at a relatively small impact load in comparison with the dash panel-side coupling end 51 of the lower bracket 43*b*.

FIGS. 8A and 8B are cross-sectional views of the dash panel side coupling end. FIG. 8A is a diagram illustrating a state before an impact load is input to the vehicle front part and FIG. 8B is a diagram illustrating a state when an impact load toward the vehicle rear side is input to the vehicle front part.

As illustrated in FIG. 8A, a fitting hole 53 having a substantially circular cross-section and penetrating from the engine room side to the vehicle interior side is formed in the dash panel 45, and a metal bush 55 is pressed and fitted into the fitting hole 53. A through-hole 55a in the axis direction is formed in the metal bush 55, and a through-hole 51a is also formed in the dash panel-side coupling end 51. The dash panel-side coupling end 51 is aligned with one end of the metal bush 55 on the vehicle interior side, a stud bolt 57 is inserted into the through-hole 55a and the through-hole 51a, and nuts 59 are fastened to both ends thereof.

As illustrated in FIG. 8B, when an impact load toward the vehicle rear side is input to the vehicle front part, the metal bush 55 is displaced from the fitting hole 53 of the dash panel 45 to the vehicle interior side and thus the dash panel-side coupling end 51 is disengaged. That is, the fitting of the metal bush 55 into the fitting hole 53 can define the impact load disengaging the metal bush 55. Here, the fitting of the metal bush 55 into the fitting hole 53 is set so that the upper bracket 43a is disengaged at a relatively small impact load in comparison with the lower bracket 43b.

For example, by setting the inner diameter of the fitting hole 53 on the upper bracket side to be larger than the inner diameter of the fitting hole 53 on the lower bracket side, the fitting on the upper bracket side can be set to be looser than the fitting on the lower bracket side. By setting the outer diameter of the metal bush 55 on the upper bracket side to be smaller than the outer diameter of the metal bush 55 on the lower bracket side, the fitting on the upper bracket side can be set to be looser than the fitting on the lower bracket side.

In the steer-by-wire type, in order to guarantee mechanical backup, the clutch 15 is disposed in the path from the steering shaft 3 to the steering gear 27. In this system configuration, the number of joint points of the universal joint has to be increased. At this time, in a state where the clutch input shaft 13 or the clutch output shaft 17 is not restricted, a torque cannot be transmitted due to a couple of forces at the bend of the joint and thus the bending of the clutch input shaft 13 or the clutch output shaft 17 has to be restricted by supporting them by the use of the vehicle body or the like. However, in a configuration in which the number of joint points increases and the clutch 15 is restricted, it is difficult to guarantee an impact absorption margin of the intermediate shaft 9. Accordingly, when an impact load in the vehicle longitudinal direction is input to the steering apparatus, it is difficult to obtain satisfactory impact absorption ability.

Therefore, in this embodiment, the upper bracket 43a and the lower bracket 43b couple the dash panel 45 and the clutch 15, and restrict the bending of the universal joints 11 and 19. The upper bracket 43a and the lower bracket 43b are set to be disengaged from the dash panel 45 depending on an impact load toward the vehicle rear side input to the steering gear 27.

Accordingly, since the upper bracket 43a and the lower bracket 43b are disengaged from the dash panel 45 depending on an impact load in the vehicle longitudinal direction, the restriction of the clutch input shaft 13 and the clutch output shaft 17 is released and the universal joints 11 and 19 become a free state. As a result, when the intermediate shaft 9, the clutch input shaft 13, the clutch output shaft 17, and the intermediate shaft 21 are freely bent depending on the impact load, the impact absorption margin of the intermediate shaft 9 is mainly extended, thereby improving impact absorption ability.

Figure 9A:
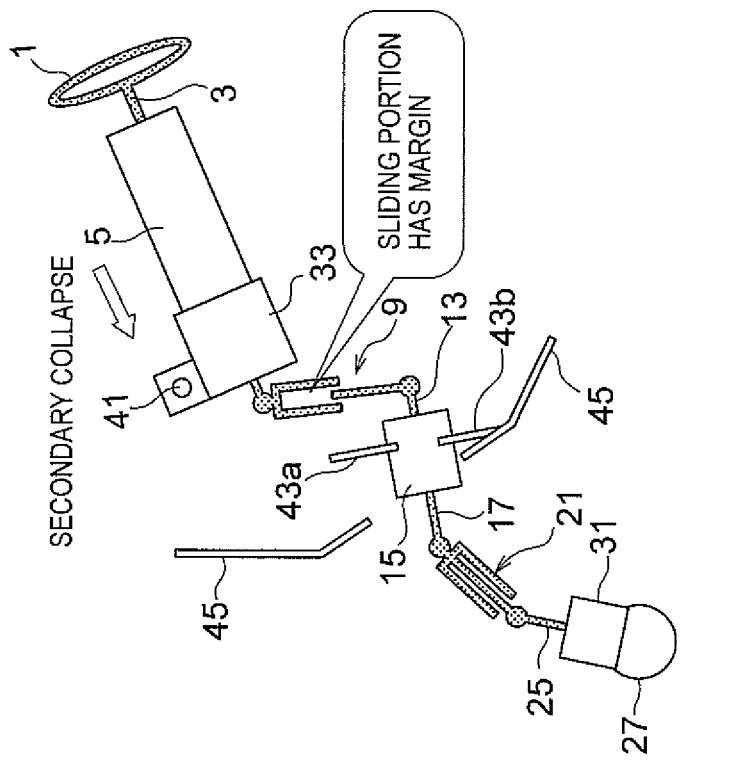
FIGS. 9A and 9B are diagrams illustrating a primary collapse and a secondary collapse when an impact load in a vehicle longitudinal direction is input.
Figure 9B:
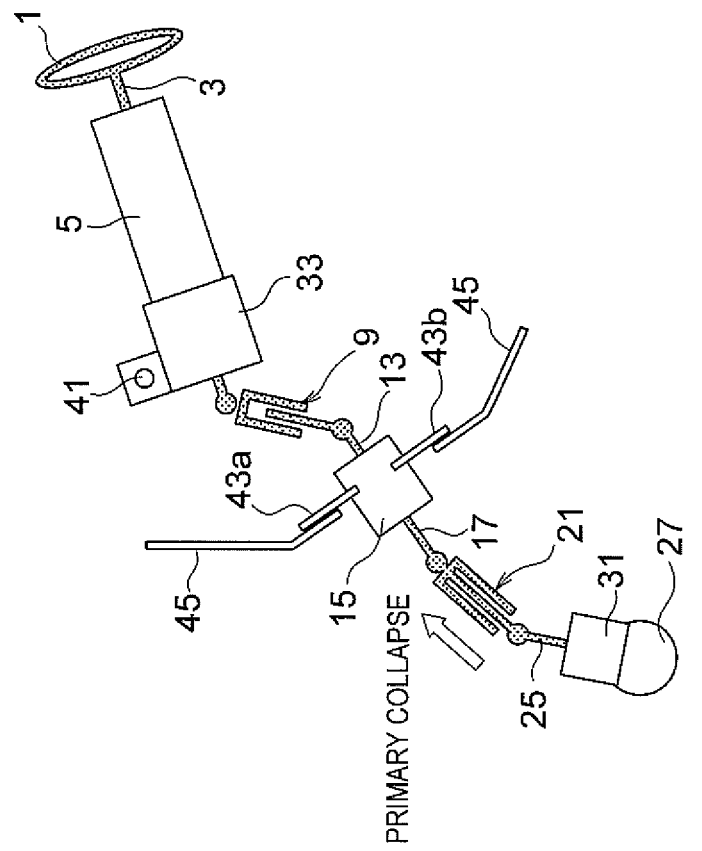

FIGS. 9A and 9B are diagrams illustrating a primary collapse and a secondary collapse when an impact load in the vehicle longitudinal direction is input. FIG. 9A illustrates a state where an impact load toward the vehicle rear side is input to the vehicle front part and a primary collapse occurs in the intermediate shaft 21, and FIG. 9B illustrates a state where an impact load toward the vehicle rear side is input to the vehicle front part and the upper bracket 43a and the lower bracket 43b are disengaged from the dash panel 45.

First, when an impact load toward the vehicle rear side is input to the vehicle front part, the steering gear 25 or the pinion shaft 25 is displaced to the vehicle rear side and the intermediate shaft 21 contracts, thereby absorbing the impact load in the vehicle longitudinal direction. In this way, by guaranteeing the impact absorption amount of the intermediate shaft 21, it is possible to improve impact absorption ability when an impact load in the vehicle longitudinal direction is input.

When the impact load exceeds the impact absorption ability of the intermediate shaft 21, the excess of the impact load is input to the upper bracket 43a and the lower bracket 43b. At this time, when the impact load is greater than a predetermined threshold value, the upper bracket 43a and the lower bracket 43b are disengaged from the dash panel 45. Here, the upper bracket 43a is set to be disengaged at a relatively small impact load in comparison with the lower bracket 43b.

Accordingly, when the impact load is smaller than a disengagement threshold value of the upper bracket 43a, any of the upper bracket 43a and the lower bracket 43b is not disengaged and is maintained in a state where they are supported by the dash panel 45. When the impact load is greater than the disengagement threshold value of the upper bracket 43a and smaller than the disengagement threshold value of the lower bracket 43b, only the upper bracket 43a is disengaged and the lower bracket 43b is maintained in a state where it is supported by the dash panel 45. When the impact load is greater than a disengagement threshold value of the lower bracket 43b, both the upper bracket 43a and the lower bracket 43b are disengaged and the upper bracket 43a is disengaged earlier than the lower bracket 43b.

In this way, when the upper bracket 43a and the lower bracket 43b are disengaged from the dash panel 45 depending on the impact load, it is possible to absorb the impact load.

When only the upper bracket 43a is disengaged or both the upper bracket 43a and the lower bracket 43b are disengaged, the point of the universal joint 11 between the clutch input shaft 13 and the intermediate shaft 9 moves to the right side in the drawing, that is, to the vehicle rear side. On the other hand, when an impact load toward the vehicle front side is input to the steering wheel 1 as a secondary collapse by a driver, the point of the universal joint 7 moves to the left side in the drawing, that is, to the vehicle front side. That is, even when the primary collapse by which clutch 15 moves to the vehicle rear side is input and the attachment position of the clutch 15 moves, it is possible to prevent the movement of the clutch from hindering the movement of the steering shaft toward the vehicle front side due to the secondary collapse to guarantee the impact absorption amount.

In addition, the numbers, shapes, sizes, and the like of the constituent elements can be arbitrarily set without departing from the gist of this embodiment.

Effects of the maim portions in the second embodiment will be described below.

(1) The steering apparatus according to this embodiment includes the upper bracket 43a and the lower bracket 43b that fixes the clutch 15 to the vehicle body and that restricts the placement angles of the clutch input shaft 13 and the clutch output shaft 17. The upper bracket 43a and the lower bracket 43b are disengaged from the vehicle body when a predetermined impact load in the vehicle longitudinal direction is input to the steering gear 27. Accordingly, since the upper bracket 43a and the lower bracket 43b are disengaged from the dash panel 45 depending on the impact load in the vehicle longitudinal direction, the restriction of the clutch input shaft 13 and the clutch output shaft 17 is released and the universal joints 11 and 19 become a free state. As a result, when the intermediate shaft 9, the clutch input shaft 13, the clutch output shaft 17, and the intermediate shaft 21 are freely bent depending on the impact load, the tilt angle of the clutch input shaft 13 relative to the horizontal plane decreases and the intermediate shaft 9 is easily extended. As a result, since a margin in the contraction direction of the intermediate shaft 9 is enlarged, it is possible to extend the impact absorption amount when an impact load toward the vehicle front side is input to the steering wheel 1 as a secondary collapse, thereby improving impact absorption ability.

(2) In the steering apparatus according to this embodiment, the upper bracket 43a is set to be disengaged at a relatively small impact load in comparison with the lower bracket 43b. Accordingly, the tilt angle of the clutch input shaft 13 relative to the horizontal plane decreases and the intermediate shaft 9 is easily extended. As a result, since a margin in the contraction direction of the intermediate shaft 9 is enlarged, it is possible to extend the impact absorption amount when an impact load toward the vehicle front side is input to the steering wheel 1 as a secondary collapse, thereby improving impact absorption ability.

While the present invention has been described with reference to the definite number of embodiments, the scope of the present invention is not limited thereto and improvements and modifications of the embodiments based on the above disclosure are obvious to those skilled in the art.

The invention claimed is:

1. A steering apparatus comprising:
   a steering wheel that is manipulated by a driver;
   a steering shaft of which one end is coupled to the steering wheel;
   a steering column supported by a vehicle body and configured to rotatably support the steering shaft;
   an intermediate shaft of which one end is coupled to another end of the steering shaft via a universal joint;
   a clutch input shaft of which one end is coupled to another end of the intermediate shaft via another universal joint;
   a clutch output shaft of which one end is disposed to face another end of the clutch input shaft;
   a clutch fixed to the vehicle body and configured to connect and disconnect the clutch input shaft and the clutch output shaft;
   a steering gear configured to convert rotational movement of the clutch output shaft into linear movement to steer vehicle wheels;
   a drive mechanism configured to apply a drive force to a power transmission system on a clutch output shaft side so as to steer the vehicle wheels in a state where the clutch is disconnected; and
   a bracket configured to fix the clutch to the vehicle body and to restrict placement angles of the clutch input shaft and the clutch output shaft,
   wherein a tilt angle of the intermediate shaft relative to a horizontal plane is set to be larger than a tilt angle of the clutch input shaft relative to the horizontal plane when viewed in a vehicle transverse direction, and
   the bracket is disengaged from the vehicle body when a predetermined impact load in a vehicle longitudinal direction is input to the steering gear.

2. The steering apparatus according to claim 1, wherein the steering column is supported by the vehicle body via a tilt pivot for adjusting a tilt position, and
   wherein when the tilt position of the steering column is in a predetermined movable range, the tilt angle of the intermediate shaft relative to the horizontal plane is set to be larger than the tilt angle of the clutch input shaft and a tilt angle of the clutch output shaft relative to the horizontal plane when viewed in the vehicle transverse direction.

3. The steering apparatus according to claim 2, wherein a center position of the universal joint between the steering shaft and the intermediate shaft and a center position of the tilt pivot are misaligned with each other when viewed in the vehicle transverse direction.

4. The steering apparatus according to claim 1, wherein the bracket includes:
   an upper bracket that couples the vehicle body to an upper part of the clutch; and
   a lower bracket that couples the vehicle body to a lower part of the clutch, and wherein the upper bracket is disengaged at a small impact load in comparison with the lower bracket.

5. A steering apparatus comprising:
   a supporting means for rotatably supporting a steering shaft including one end coupled to a steering wheel, the supporting means being supported by a vehicle body;
   a transmission means for connecting and disconnecting between an input shaft to which rotational movement of the steering shaft is transmitted and an output shaft, the transmission means being fixed to the vehicle body;
   a coupling means for coupling the steering shaft with the input shaft via an extendable shaft such that an angle between the steering shaft and the extendable shaft and an angle between the extendable shaft and the input shaft are variable;
   a steering means for steering vehicle wheels by converting rotational movement of the output shaft into linear movement;
   a drive force applying means for applying a drive force to a power transmission system on an output shaft side so as to steer the vehicle wheels in a state where the transmission means disconnects the input shaft and the output shaft; and
   a restricting means for restricting placement angles of the input shaft and the output shaft by fixing the transmission means,
   wherein a tilt angle of the extendable shaft relative to a horizontal plane is set to be larger than a tilt angle of the input shaft relative to the horizontal plane when viewed in a vehicle transverse direction, and
   the restricting means is disengaged from the vehicle body when a predetermined impact load in a vehicle longitudinal direction is input to the steering means.

* * * * *